United States Patent
Uchiumi

(10) Patent No.: US 7,369,363 B2
(45) Date of Patent: May 6, 2008

(54) METHOD FOR PRODUCING MAGNETIC TAPE IN WHICH A PRESCRIBED WINDING HABIT IS IMPARTED TO THE MAGNETIC TAPE

(75) Inventor: Kyohisa Uchiumi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 318 days.

(21) Appl. No.: 11/041,696

(22) Filed: Jan. 25, 2005

(65) Prior Publication Data
US 2005/0179166 A1   Aug. 18, 2005

(30) Foreign Application Priority Data
Feb. 16, 2004   (JP) .............................. 2004-038337

(51) Int. Cl.
*G11B 5/78* (2006.01)
*B29B 17/00* (2006.01)

(52) U.S. Cl. ...................... 360/134; 264/342

(58) Field of Classification Search ..................... None
See application file for complete search history.

(56) References Cited

U.S. PATENT DOCUMENTS
4,203,564 A * 5/1980 Nemoto ...................... 242/606

FOREIGN PATENT DOCUMENTS
| JP | 1-313238 A | 12/1989 |
| JP | 9-138945 A | 5/1997 |
| JP | 11-265560 A | 9/1999 |

* cited by examiner

*Primary Examiner*—A. J. Heinz
(74) *Attorney, Agent, or Firm*—Sughrue Mion, Pllc.

(57) ABSTRACT

A method for producing a magnetic tape and method for improving a winding form of the magnetic tape are provided. These methods comprises a stage for winding a magnetic tape around a tape reel; and a stage for thermally treating the magnetic tape wound around the tape reel under preset thermal treatment conditions to impart the magnetic tape to winding habit. In the winding state, the magnetic tape is wound around a tape reel whose hub circumference is formed into a tapered state in the stage for winding a magnetic tape.

14 Claims, 15 Drawing Sheets

3(30)

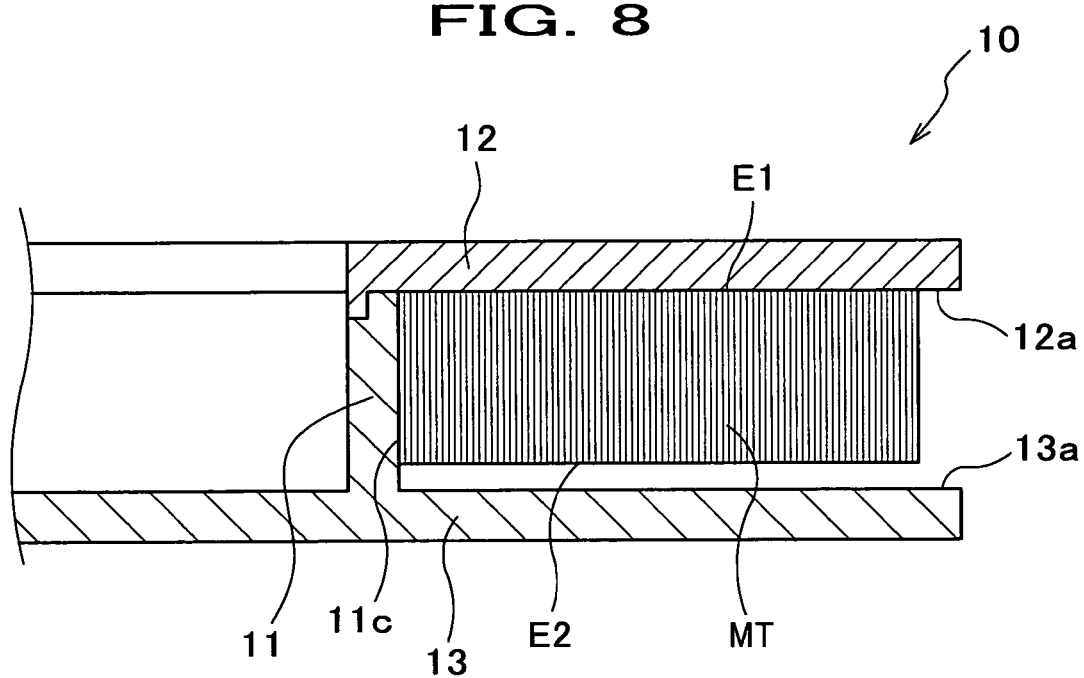
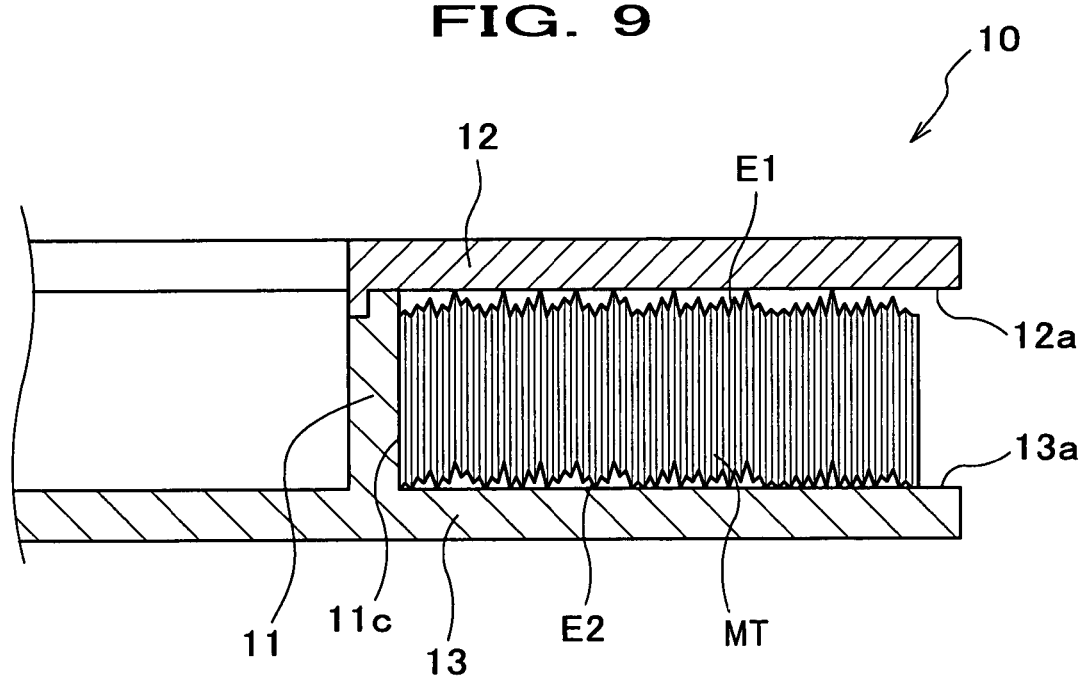

METHOD FOR PRODUCING MAGNETIC TAPE IN WHICH A PRESCRIBED WINDING HABIT IS IMPARTED TO THE MAGNETIC TAPE

BACKGROUND OF THE INVENTION

1. Field of the Invention

The present invention relates to a method for producing a magnetic tape. More specifically, the present invention relates to improvement of disorder of a wound form of a magnetic tape wound around a tape reel. The present invention further relates to a magnetic tape whose wound form is improved, and to a method for improving a wound form of a magnetic tape. The present invention is based on Japanese Patent Application No 2004-38337, filed on Feb. 16, 2004 the disclosure of which is incorporated herein by reference.

2. Description of the Related Art

In conventional, audio tapes, video cassette tapes, memory tapes, video tapes for broadcasting and other tapes are utilized as recording media in various fields. Also, as shown in FIG. 14, a magnetic tape cartridge has been well-known as recording media having a large capacity, in which a magnetic tape MT wound around a single tape reel 10A is stored (see, for example, Japanese Patent Laid-Open Publication No.11-265560).

All of the magnetic tapes used in these recording media are typically utilized in the state that they are wound around a tape reel 10 (or 10A) as shown in FIG. 1, FIG. 7, FIG. 8, and FIG. 14. FIG. 1 is an exploded perspective view showing one example of a recording medium utilizing a tape reel 10, FIG. 7 is a perspective view showing one example of a tape reel 10, FIG. 8 is a cross-sectional view of FIG. 7 taken along a line A-A, and FIG. 14 is a perspective view of a magnetic tape cartridge in which one tape reel is stored.

For example, as shown in FIG. 7 and FIG. 8, a tape reel 10 is composed of a cylindrical hub 11, a pair of disk-shaped flanges 12 and 13 (upper flange 12 and lower flange 13) fixed onto the hub 11 in a facing manner parallel to a lower end 11a and an upper end 11b of the hub 11, and the tape reel 10 winds the magnetic tape MT around an outer circumference 11c of the hub 11. At a time of winding or feeding the magnetic tape MT, the upper flange 12 and the lower flange 13 regulate positional variation of the magnetic tape MT in its width direction through an inner surface 12a of the upper flange 12 and an inner surface 13a of the lower flange 13 to serve the function of stabilizing the driving of the magnetic tape MT.

A distance between the upper flange 12 and the lower flange 13 is set to be slightly wider than the width of the magnetic tape MT in order to prevent either of tape edges E1 and E2 from being damaged due to collision with either of the inner surface 12a of the upper flange 12 and the inner surface 13a of the lower flange 13 at a time of winding or feeding the magnetic tape MT. For example, in FIG. 8, the magnetic tape MT is wound around the hub 11 in the state that the tape edge E1 is in contact with the inner surface 12a of the upper flange 12 and, thus, clearance is provided between the tape edge E2 of the magnetic tape MT and the inner surface 13a of the lower flange 13.

In the case where the clearance is provided between the tape edge E2 of the magnetic tape MT and the inner surface 13a of the lower flange 13 as shown in FIG. 8, in some cases, parts of the magnetic tape MT would be projecting from the tape edge E2 into the clearance, whereby so-called "disordered winding" would occur in which the tape edge E2 becomes uneven as shown in FIG. 9.

If disordered winding occurs, the position of the magnetic tape MT in the width direction of the magnetic tape is varied, driving the magnetic tape MT in an unstable manner. This would bring about servo tracking abnormality or such, making it difficult to maintain good recording/reproducing characteristics of the magnetic tape.

If disordered winding occurs, the tape edges E1 and E2 are easily damaged during the course of transfer, posing a problem in terms of quality control. In particular, in the case of video tape, which records sound data in the vicinity of the tape edge E1 or E2, a problem would occur in that sound cannot be surely outputted at the time of reproduction.

Particularly, in the magnetic tape cartridge 1A (see FIG. 14 for the magnetic tape cartridge) composed of magnetic tape MT wound around the tape reel 10 (see FIG. 8) as disclosed in Japanese Patent Laid-Open Publication No. 11-265560, according to increasing of the capacity and density, the thickness of the magnetic tape becomes much thinner, and the surface of the magnetic tape becomes much more flattened.

This leads to the situation where disordered winding occurs much more frequently at the time of driving the magnetic tape by means of a drive. Also, at the time of the production, disorder of the magnetic tape when the tape is wound around a winder (not shown) tends to occur more often.

Various causes can be considered for disorder of wound tape, one of which is the fact that when the magnetic tape MT is wound around the hub, the magnetic tape MT is slid in the width direction due to the air entering between the magnetic tape.

Particularly, it has been experimentally known that in a production stage for producing the magnetic tape cartridge 10 shown in FIG. 10, which comprises the tape reel 10A as a constituting part, if the speed for winding the magnetic tape 10A is set at a high level (for example, 10 to 20 m/s) in order to enhance the productivity, the occurrence of disordered winding significantly increases.

Other factors for causing disordered winding, which can be considered, are (1) the magnetic tape MT is irregularly curved in the width direction; (2) tension distribution loaded to the magnetic tape MT is biased, (3) due to the magnetic tape being stored in a state of disordered winding, the winding form of the magnetic tape is deformed or such.

As shown in FIG. 15A, it has hitherto been known that when the magnetic tape MT is wound around a hub 110 of a tape reel 100, a rotating endless belt 200, which is made of an elastic material such as rubber supported by rotating rollers 210, 220, and 230, is pushed onto the surface of the magnetic tape MT to allow the air entering in spaces of the magnetic tape MT for escaping therefrom whereby the disordered winding of the magnetic tape is decreased. Also, as shown in FIG. 15B, it has also been known that a touch roll 300 made of an elastic material such as rubber is used instead of the endless belt 200.

In addition, Japanese Patent Laid-Open No. 1-313283 discloses that as shown in FIG. 16A, a magnet 190 comprising concentrically divided inner region 191 and outer region 192 where in both regions 191 and 192, end surfaces facing to the end line of the tape are hetero poles, and the magnetic tape MT is wound while attracting it to a flange of a tape reel 130 by a magnetic force "i" possessed by the magnet 190, to thereby change the winding form for the better. The invention disclosed therein exhibits excellent effects in terms of changing the winding form of the magnetic tape at the time of the production for the better.

However, while the technique disclosed in Japanese Patent Laid-Open No. 1-313283 can change the winding form of the magnetic tape at the time of the production for the better, i.e., can prevent the disordered winding at the time of the production, disordered winding still occurs after the magnetic tape has been purchased and used by a user.

On the other hand, according to the invention disclosed in Japanese Patent Laid Open No. 9-138945, a tapered winding surface 91 is formed on a winding shaft 90 where the shaft diameter of one end (long winding shaft 90a) is different from that of the other end (short winding shaft 90b) (See FIG. 16B), the magnetic tape MT is wound around the winding shaft 90, the magnetic tape MT, which is in the wound state, is left standing over a prescribed period of time whereby the magnetic tape falls into the habit of winding. According to the invention disclosed therein, the product excels in terms of capability of preventing the magnetic tape from disordered winding even after the product has been distributed to a user.

However, in the conventional methods shown in FIG. 15A and FIG. 15B, since abrasion powder occurs due to direct contact of the endless belt 200 or the touch roll 300 with the magnetic tape MT, the contact with the magnetic tape MT is preferably reduced as little as possible.

In the invention disclosed in Japanese Patent Laid Open No. 1-313283-138945 shown in FIG. 16A, the problem remains that the technique is not applicable, if the thickness of the magnetic tape MT becomes thinner.

In the invention disclosed in Japanese Patent Laid Open No. 9-138945 shown in FIG. 16B, a long period is required for the magnetic tape MT to assume a winding habit, which is not preferred in terms of productivity.

The present invention has been made in light of the situation mentioned above, and an object of the present invention is, therefore, to provide techniques in which a prescribed winding habit is imparted to the magnetic tape at the time of production, whereby the disordered winding is prevented during the course of the production and shipping the product, and which makes it difficult to generate disordered winding after the product is used by a user (such as a method for producing a magnetic tape, a magnetic tape itself, and a method for improving the winding form of the magnetic tape)

SUMMARY OF THE INVENTION

According to the present invention, there is provided a method for producing a magnetic tape comprising:

a stage for winding a magnetic tape around a tape reel; and a stage for thermally treating the magnetic tape wound around the tape reel under preset thermal treatment conditions to impart a winding habit to the magnetic tape;

said magnetic tape being wound around a tape reel whose hub circumference is formed into a tapered state in said stage for winding a magnetic tape.

Also, the present invention provides a magnetic tape having an improved winding form.

Furthermore, the present invention provides a method for improving a winding form of a magnetic tape, a stage for winding a magnetic tape around a tape reel; and a stage for thermally treating the magnetic tape wound around the tape reel under preset thermal treatment conditions to impart a winding habit to the magnetic tape;

said magnetic tape being wound around a tape reel whose hub circumference is formed into a tapered state in said stage for winding a magnetic tape.

The term "preset heat conditions" intended herein encompasses the heat treatment conditions such as heating temperature, heating period, humidity conditions at the time of heating and the like set considering the materials making up the magnetic tape. Preference is given to use a temperature immediately below the glass transition point of a glass for the base.

The winding stage intended herein means a stage for winding a magnetic tape produced in advance or a stage, subsequent to a stage for producing a magnetic tape, which winds the resulting magnetic tape.

BRIEF DESCRIPTION OF THE DRAWINGS

FIG. 5 is a cross-sectional view of a main portion of a pan cake, which imparts a curve to the magnetic tape so as to have a good winding habit; where

FIG. 8 is a cross-sectional view of FIG. 7 taken along line A-A;

FIG. 9 shows a condition of the tape reel in which the tape edges are disordered;

DESCRIPTION OF THE PREFERRED EMBODIMENTS

Embodiments of the present invention will now be described below referring to the attached figures as occasion may demand.

In the following embodiments, a situation will be described where a magnetic tape MT having good winding habit by imparting a uniform curve through a tape reel of a pan cake 3 (see FIG. 3) is wound around a tape reel 10, which is one constitution element of a magnetic tape cartridge (typically video cassette tape) 1 in a prescribed amount. The term "pan cake" intended herein means one in which original base material of the magnetic tape, which is wide, is cut into a tape width according to the standard of the product (magnetic tape cartridge 1), and then wound.

Constitution of Magnetic Tape

Figure 3:
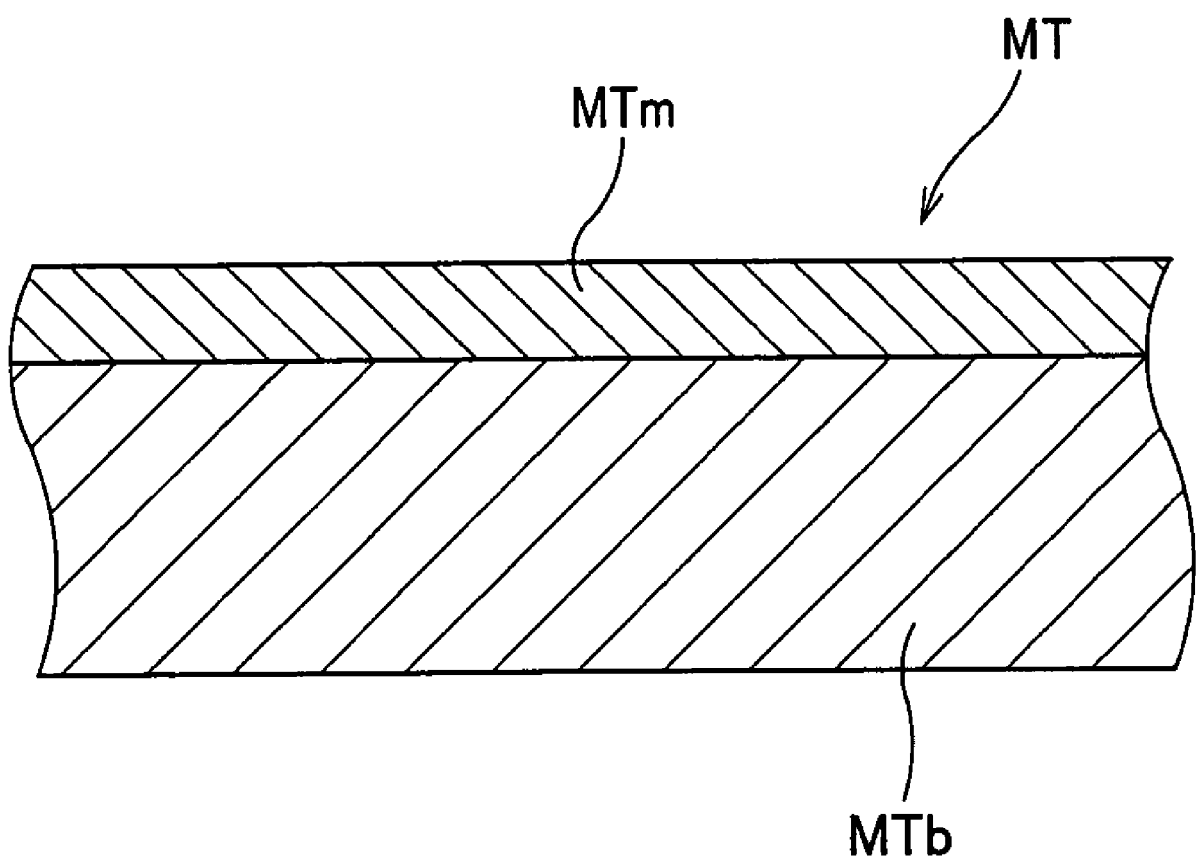
FIG. 3 is a cross-sectional view partially enlarging a part of the magnetic tape MT.

Referring to FIG. 3, the constitution of the magnetic tape, which is produced by the method of the present invention (whose winding form is improved by the present invention), will be described. FIG. 3 is a cross-sectional view partially enlarging a part of the magnetic tape MT.

As shown in FIG. 3, in the magnetic tape MT, a magnetic layer MTm is formed on a non-magnetic base (base film) MTb. The magnetic layer MTm is formed by coating magnetic paint prepared by mixing magnetic powder, a binder, and an organic solvent until the magnetic powder is dispersed uniformly, on the base MTb. Alternatively, the magnetic layer MTm may be formed by coating ferromagnetic materials, such as metal and an alloy, on the base MTb by means of vacuum vapor deposition or sputtering. In addition, additive agents, such as a dispersant, lubricant, an antistatic agent, a plasticizer, a stabilizer, and a rust preventing agent, are added to the magnetic paint.

Examples of the magnetic powder, which may be used, includes, but are not restricted to, ferromagnetic metal particles composed of a metal such as ferromagnetic iron oxide particles such as gamma-$Fe_2O_4$, and cobalt coated-gamma-$Fe_2O_4$, and ferromagnetic cobalt dioxide particles, ferromagnetic metal particles composed of metal such as Fe, Co, and Ni, and an alloy thereof, and a hexagonal plate-like hexagonal system ferrite particles.

Examples of the binders, which can be used, include, but are not restricted to polymers, such as urethane, vinyl chloride, vinyl acetate, vinyl alcohol, vinylidene chloride, acrylates, styrene, butadiene, and acrylonitrile, copolymers composed of two or more monomers just mentioned, polyester resin, and epoxy resin.

Examples of the organic solvents, which can be used for preparing the magnetic paint, include, but are not restricted to ethers, esters, ketons, aromatic hydrocarbons, aliphatic hydrocarbons, and chlorinated hydrocarbons.

As the material of the base MTb, polyesters such as polyethylene terephthalate (PET) and polyethylene naphthalate (PEN), polyolefins such as polypropylene, cellulose derivatives such as nitrocellulose, macromoleculars such as polyamide, polyimide, polyvinyl chloride, and polycarbonate aramid can be used.

As the base MTb, the use of polyester, excelling in processability and machine characteristic, with low cost.

More preferably, polyethylene naphthalate (PEN) with higher intensity, stronger rigidity, and higher heat resistance, than those of polyethylene terephthalate (PET) is used. Moreover, aramid is preferably used when heat resistance is not required.

Stage for Producing Magnetic Tape

Figure 1:
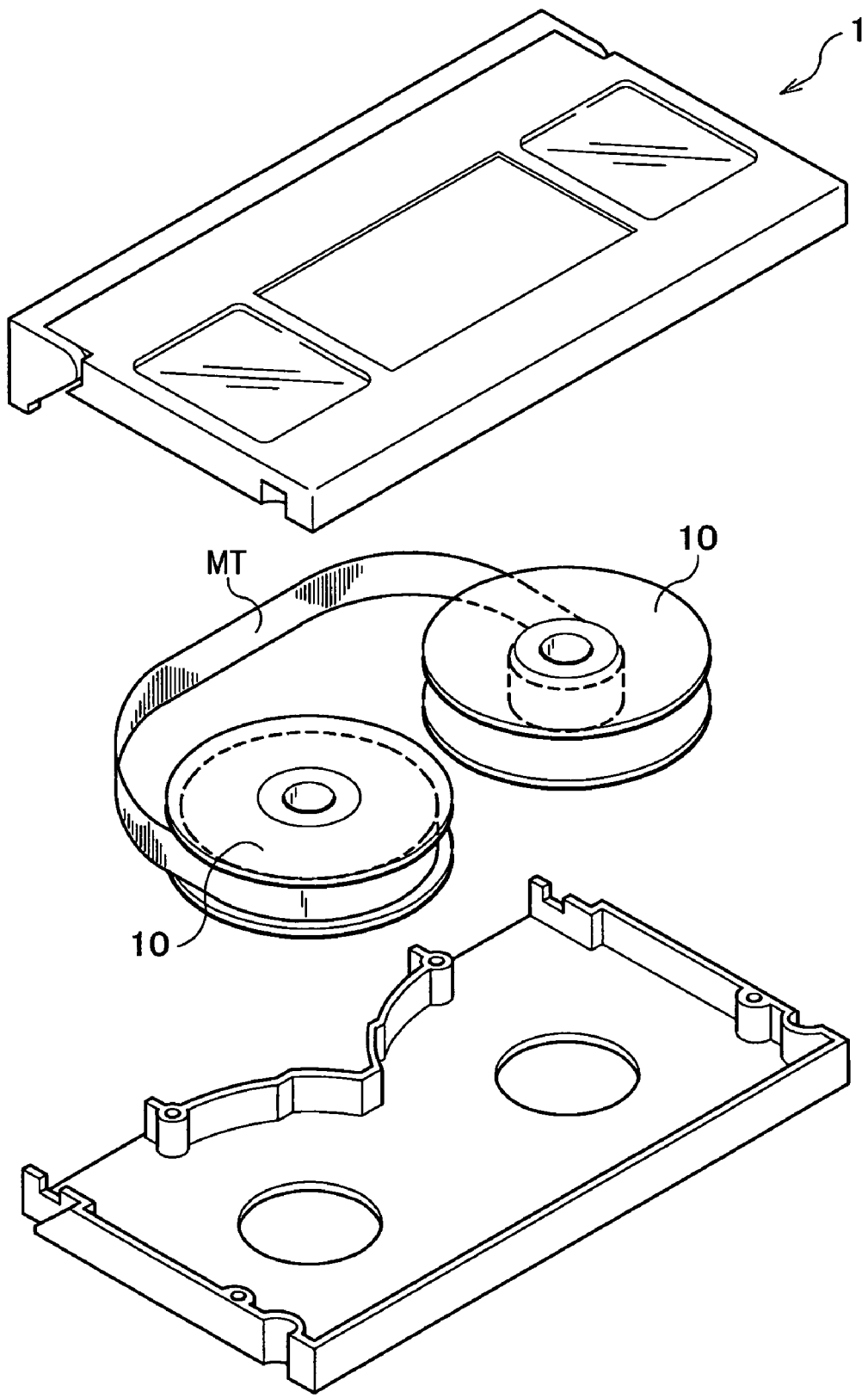
FIG. 1 is a perspective view showing an outline of a magnetic tape cartridge 1.

Subsequently, a stage for producing a magnetic tape, which applies improvement of the winding form according to the present invention will now be described by referring to FIG. 1 and FIG. 2. FIG. 1 is a perspective view showing an outline of a magnetic tape cartridge 1, and FIG. 2 is a front view schematically showing a tape winder 2.

Usually, in the production stage of the magnetic tape cartridge 1, winding the magnetic tape MT supplied from the original base material of the magnetic tape MT around the tape reel 10 making up the magnetic tape cartridge 1 is carried out as follows:

First, the wide original base material of the magnetic tape MT produced via a liquid preparation stage, an application stage, and a surface-treatment stage is cut into a tape width defined according to the standard of the product (magnetic cartridge 1) stored within the tape reel 10, and is wound to produce the pan cake 3.

Figure 2:
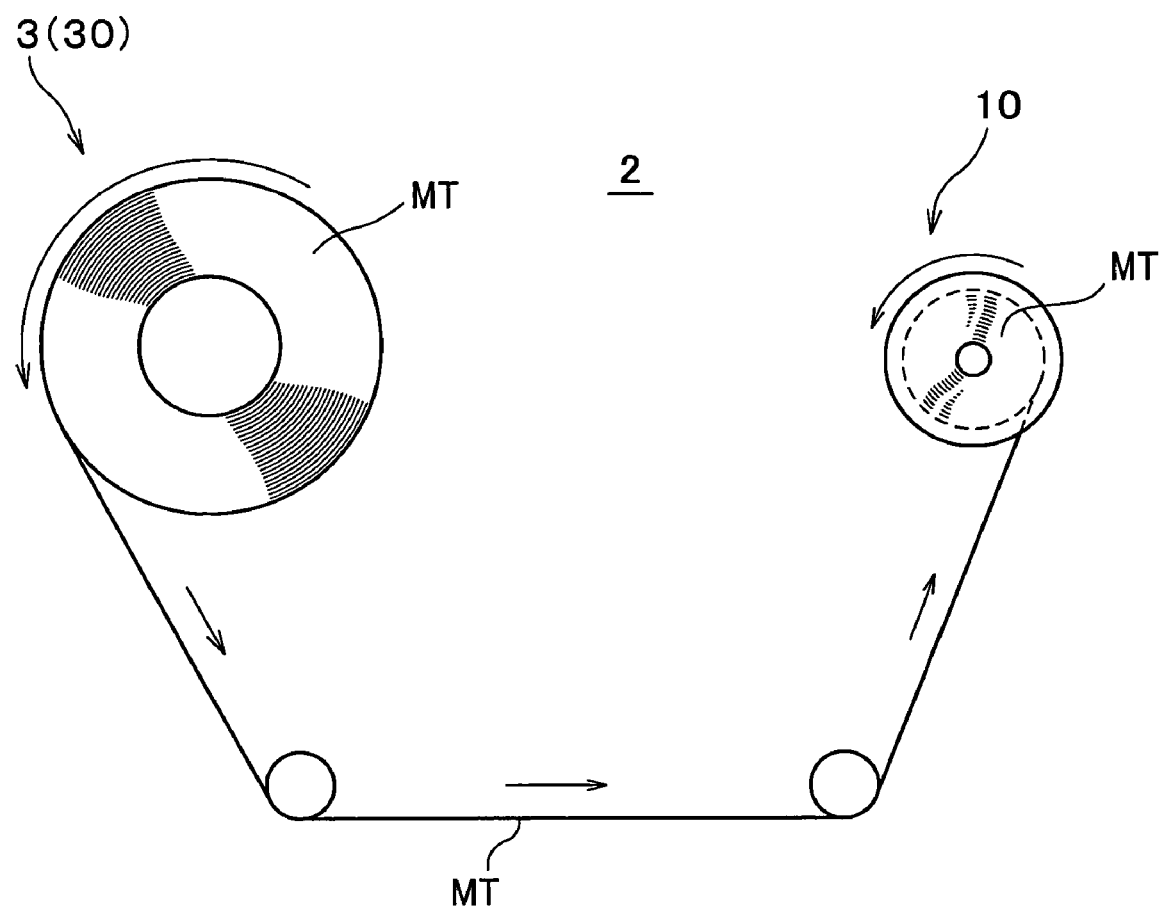
FIG. 2 is a front view schematically showing a tape winder 2.

Then, a tape winder 2, which is a special device for winding a magnetic tape as shown in FIG. 2, is used to wind a prescribed amount of the magnetic tape MT fed from the pan cake 3, which is then cut.

Application of Uniform Curve

Uniform curve applied to the magnetic tape MT is preferably applied in the stage where the magnetic tape MT is wound around the pan cake 3 in the production stage of the magnetic tape cartridge 1, but the present invention is not restricted thereto. For example, the original base material of the magnetic tape MT may be wound around a tape reel (not shown) whose hub circumference is formed into a tapered state to apply a uniform curve. Alternatively, uniform curve may be applied to the magnetic tape MT in the state being wound around the tape reel 10 of the magnetic tape cartridge 1.

Now, one preferred embodiment that the improvement of the winding form of the magnetic tape according to the present invention is applied to the production stage of the magnetic tape cartridge 1 will be described. In this preferred embodiment, uniform curve is applied to the magnetic tape MT having been wound around the pan cake 3 to impart a good winding habit to the magnetic tape MT (first embodiment) will be described according to the following procedures (1) to (3). The pan cake around which the magnetic tape 1 is wound in a tapered state is symbolized as numeric 30.

Figure 5A:
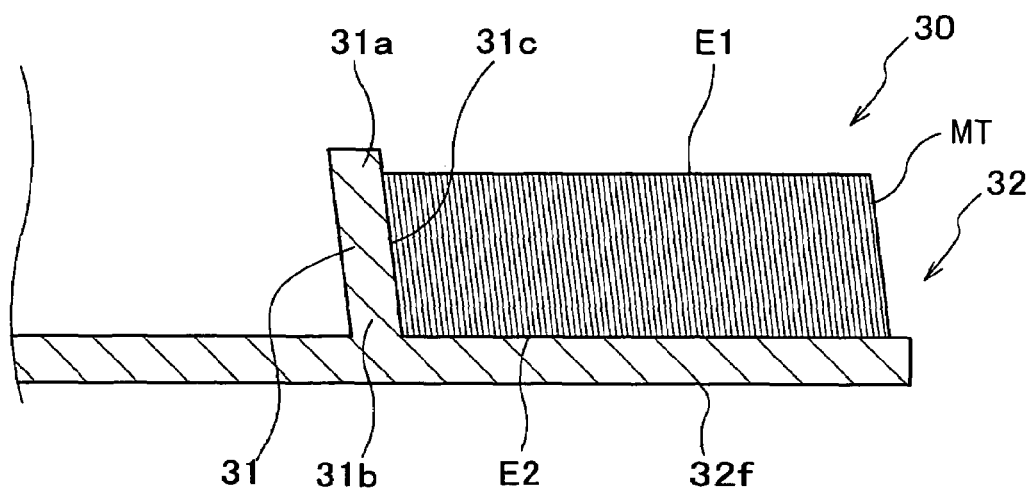
FIG. 5A is a cross-sectional view of the pan cake where the magnetic tape is wound around a tape reel whose hub circumference surface is formed into a tapered form (first embodiment)

(1) Winding Stage:

As described above, the ordinal base material of the magnetic tape is cut into the tape width according to the standard of the product to be accommodated in the tape reel and then wound whereby the pan cake 30 has a cross-section shown in FIG. 5A.

Specifically, when the magnetic tape MT is wound around a tape reel 32 whose circumference surface of a hub 31 (hub circumference 31c) is formed into a tapered state or tapered/conical shape, tension distribution occurs due to the taper, where the magnetic tape MT comes near the high tension side, specifically a lower side (E2 side) in the case of FIG. 5A. Consequently, the magnetic tape MT is wound while coming into contact with a lower flange 32f.

The ratio of the outer circumference of the longer winding shaft 31b to that of the shorter winding shaft 31a can be set as shown in Table 1 of Examples, which will be described later on, from the relation of the amount to be curved (m/mm).

Figure 4:
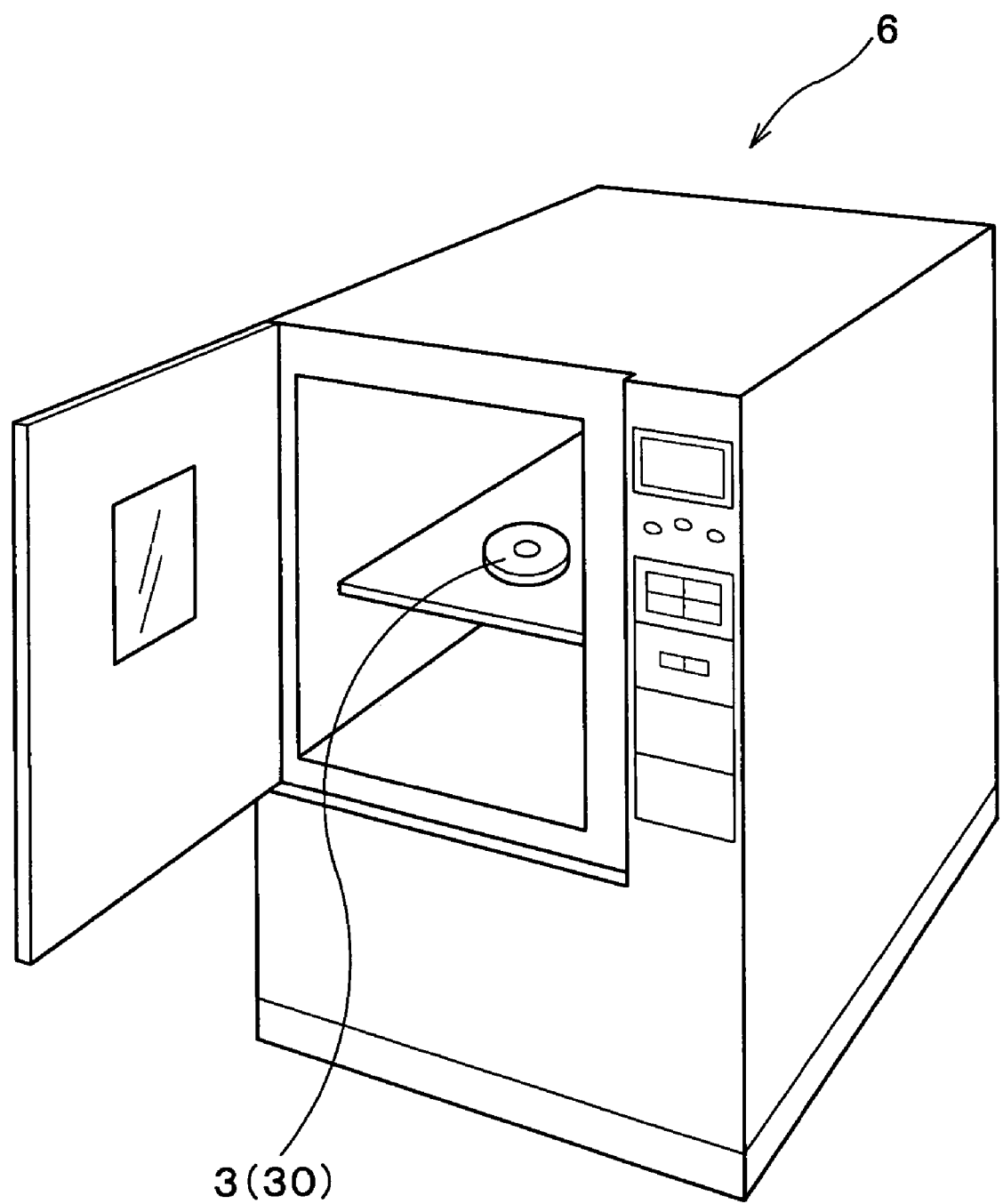
FIG. 4 shows a thermal treatment within a thermo-controlled, humidity-controlled bath.

(2) Thermal Treatment Stage:

Subsequently, the pan cake 30 in which the magnetic tape MT has been wound in a tapered state as just mentioned is then subjected to thermal treatment under preset thermal treatment conditions. As shown in FIG. 4, the thermal treatment is preferably performed in a thermo-controlled, humidity-controlled bath 6 as shown in FIG. 4. The thermo-controlled, humidity-controlled bath 6 can suitably set the heating temperature, heating period, humidity and the like.

The term "preset thermal treatment conditions" intended herein are presetting of the heating temperature, the heating period, the humidity at the time of thermal treatment, and the like. Suitable heating temperature in this embodiment is a temperature just below the glass transition point of the glass, which is used in the base making up the magnetic tape, typically a temperature approximately 0 to 30° C., preferably approximately 5 to 10° C., lower than the glass transition point. The thermal treatment at a temperature just below the glass transition point imparts the winding habit to the magnetic tape MT in much more effectively manner. Particularly, when the base MTb is made up of polyethylene terephthalate (PET), polyethylene naphthalate (PEN), or aramide, the winding habit can effectively imparted to the magnetic tape MT by the thermal treatment at a temperature just below the glass transition point.

More typically, as for PET whose transition point ranging from approximately 60 to 70° C., when PET having a glass transition point of 69° C. is used the base MTb, the environmental temperature within the thermo-controlled, humidity-controlled bath 6 is preferably set to be from 40 to 69° C., and more preferably from 50 to 65° C. As for PEN whose transition point ranging from approximately 110 to 120° C., when PEN having a glass transition point of 113° C. is used the base MTb, the environmental temperature within the thermo-controlled, humidity-controlled bath 6 is preferably set to be from 103 to 108° C. Although the glass transition point of aramid is difficult to be determined, when an aramid is used as the base MTb, the environmental temperature within the thermo-controlled, humidity-controlled bath 6 is preferably set to be from 100 to 120° C.

In other words, the heating temperature should be sufficient for imparting given winding habit to the magnetic tape MT and not lower than a temperature which deteriorates performance of a base making up said magnetic tape (typically glass transition point).

The heating period can be suitably decided and applied depending upon the material making up the base.

Also, the humidity can be suitably decided and applied considering the material making up the base and the heating period. When PET or PEN is used, the humidity is preferably from 50 to 90%, and more preferably from 60 to 80%.

Figure 6:
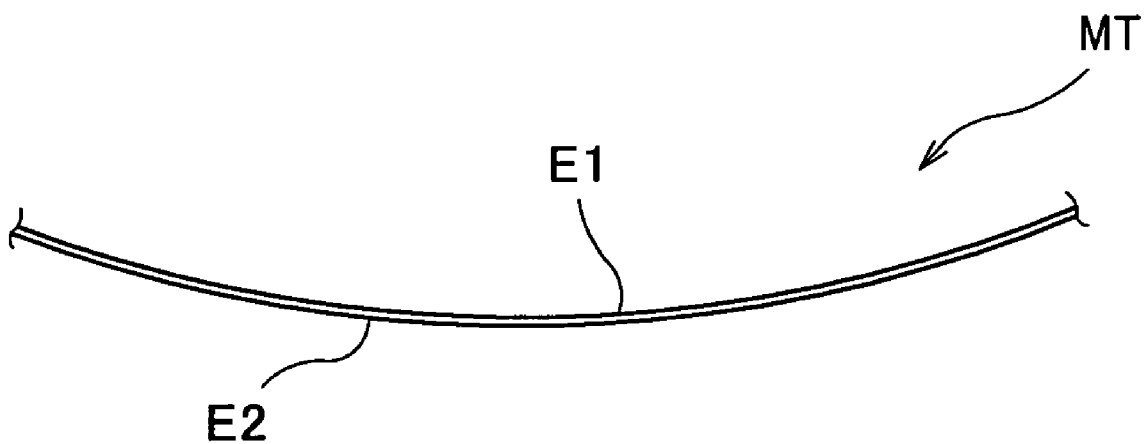
FIG. 6 shows the magnetic tape MT which having a good winding habit imparted thereto by imparting a uniform curve to the magnetic tape MT through tape edges E1 and E2.
Figure 7:
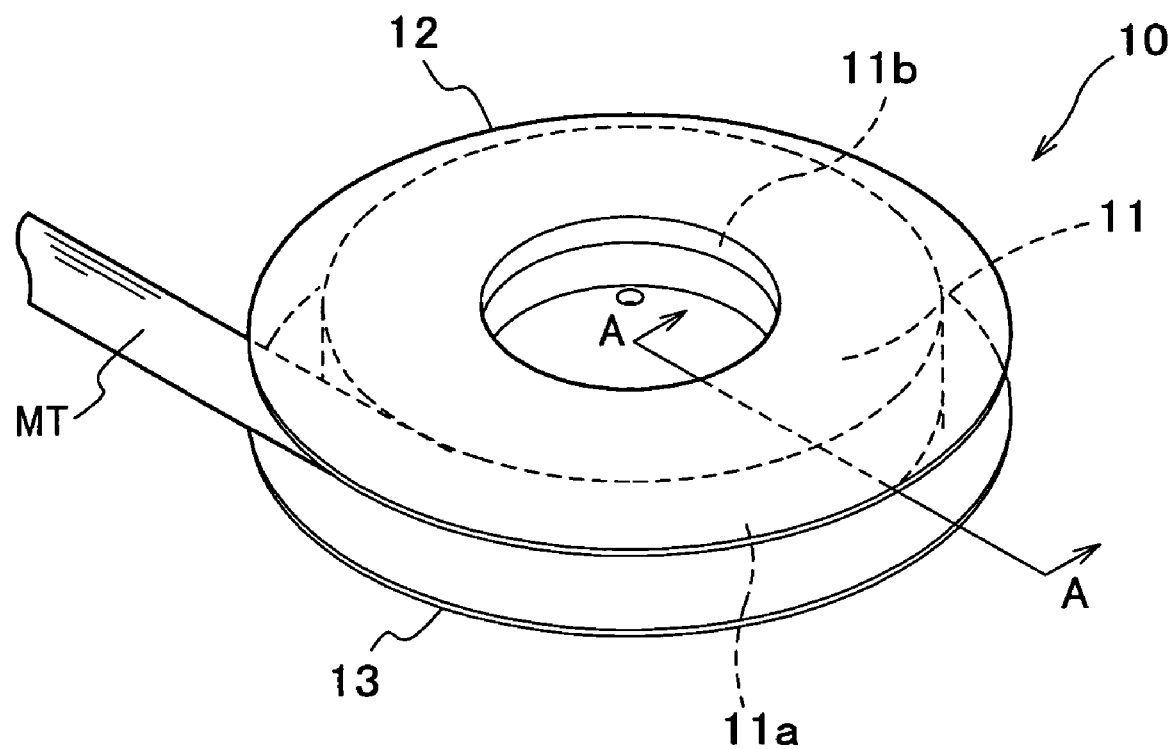
FIG. 7 is a perspective view showing one example of the tape reel 10.

To the magnetic tape MT having undergone the thermal treatment as described above is imparted with a good winding habit which is uniformly curved toward the tape edge side E1 as shown in FIG. 6.

(3) Transferring Stage:

Thereafter, the magnetic tape MT having the good winding habit imparted thereto as described above is subjected to the tape winder 2 shown in FIG. 2 to wind it in a prescribed amount, onto the tape reel 10.

As described above, in the stage for producing the magnetic tape MT, (1) winding stage, and (2) thermal treatment stage can be performed to impart a good winding habit to the magnetic tape MT. Then, the tape reel 10 which can be accommodated in the product can be produced from the pan cake 30 in the transfer stage. The magnetic tape MT is wound around and stored on the tape reel 10 in good winding form (in FIG. 5A, the winding habit is imparted so as to be curved toward the side of tape edge E1). Consequently, when the winding form of the magnetic tape MT around the tape reel 10 is as shown in FIG. 8, a force is always applied so that the tape edge E1 of the magnetic tape MT comes into contact with the tape reel 10. This makes it difficult to generate disorder at the time of shipping or during the course of driving the magnetic tape MT.

EXAMPLES

The present invention will be described by referring to working examples.

In these examples, a magnetic tape is wound around a hub whose hub circumference is formed into a tapered state, and determining (1) tilting amount of the hub, (2) thermal treatment conditions, and (3) outer diameter of the hub.

(1) Tilting Amount of Hub

Figure 10:
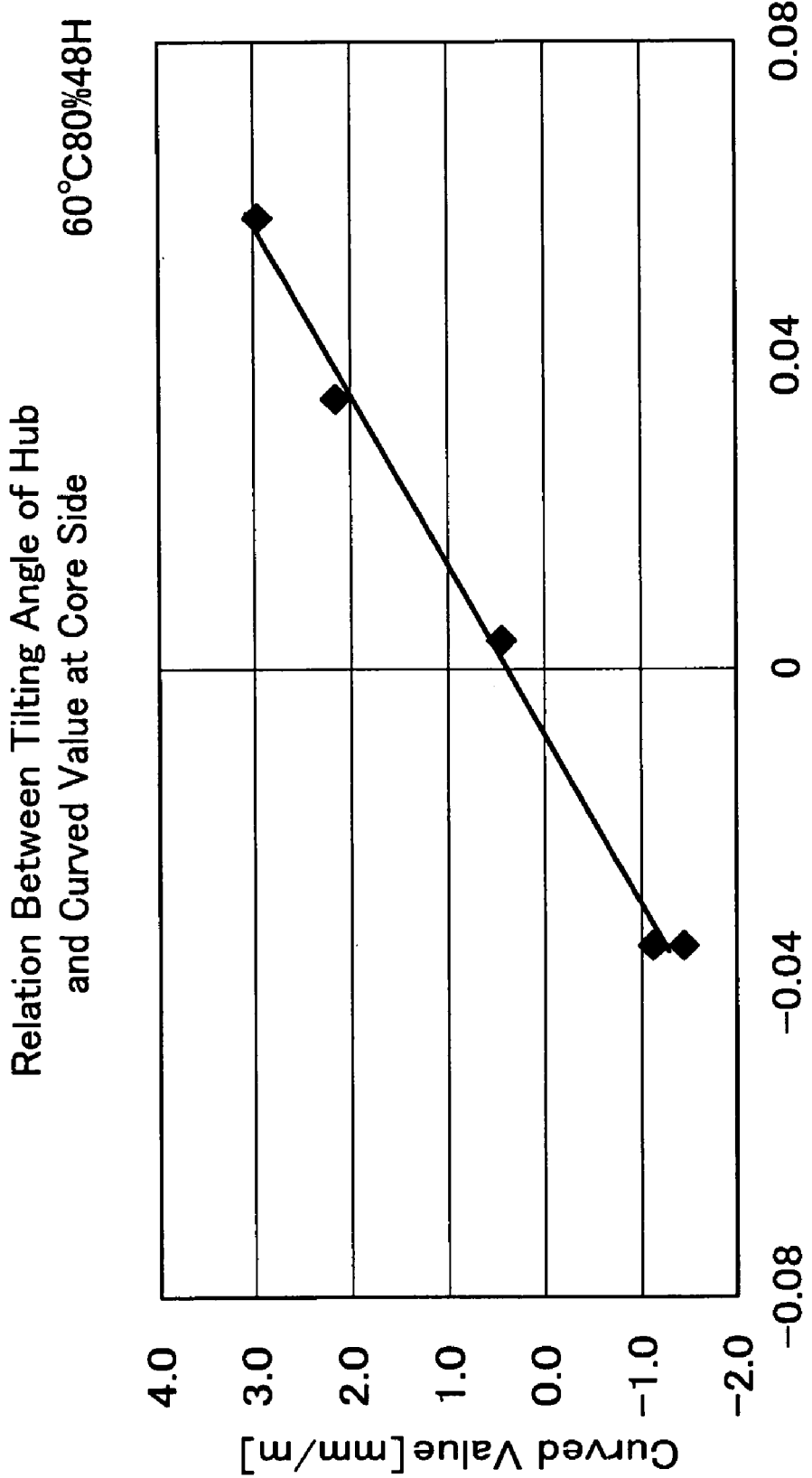
FIG. 10 shows a graph showing the relation between the tilting angle of the hub circumference surface and the curved value of the magnetic tape.

With regard to the tapered amount of the hub circumference, the ratio of the outer circumference of the hubs is set depending upon a desired amount of curve to be applied. FIG. 10 shows a graph showing the relation between the tilting angle of the hub circumference surface and the curved value of the magnetic tape, and indicates the results of measuring amounts of the curved value of a magnetic tape (shown by solid diamond "♦", when 9 microns-thick, PET-made magnetic tape having a width of 12.7 mm (½ inch) was wound around a plurality of hubs having a diameter of 114 mm and having and each having a different tilting angle, followed by thermal treatment at a temperature of 60° C., at a humidity of 80% for 48 hours.

It has been proven from the results of the experiments that the amount of the magnetic tape to be curved can be controlled by varying the tilting angle of the hub circumference. The tilting angle of the hub circumference can be determined by the ratio of the outer circumferences, which may be a value shown in the following Table 1 for a desired tilting angle.

TABLE 1

| | Curve (m/mm) | | | |
|---|---|---|---|---|
| | 0.5 | 1 | 2 | 4 |
| Outer Circumference Ratio of Hub | 1.00007 | 1.0001 | 1.0003 | 1.0006 |

Figures 11A, 11B:
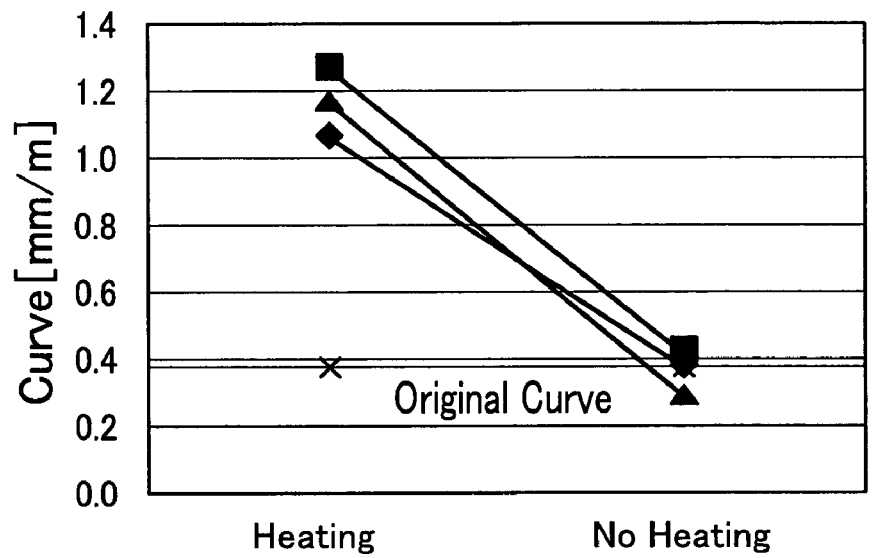
FIG. 11A is a graph showing comparative results of the curved value applied with or without thermal treatment.
FIG. 11B is a graph showing the relation between the temperature conditions and the amount of the curve.

(2) Thermal Treatment Conditions:

PET was used as the base in order to apply the wound magnetic tape to uniform curve to thereby impart it to good winding habit, and the magnetic tape was thermally treated for 36 hours in a thermo-controlled, humidity-controlled bath where the thermal treatment conditions are set at a temperature of 50° and at a humidity of 20%. FIG. 11A is a graph showing comparative results of the curved value applied with or without thermal treatment. In FIG. 11A, symbols "■", "▲" and "♦" each represents an amount of the magnetic tape curved at a different portion, and symbol "x" represents the amount of the magnetic tape curved before the thermal treatment.

It can be proven from FIG. 11A that curve is much more imparted by the thermal treatment.

Also, this indicates that it is desirable for imparting the magnetic tape to a desired amount of curve to optimize the temperature condition, the humidity condition, and heating period at the thermal treatment, in addition to the optimization of the tapered amount of the hub.

(2-1) Temperature Condition

The temperature condition at the time of the thermal treatment should be lower than the glass transition point of the base of the magnetic tape. In this example, the base material is made of PET, and the temperature condition was not more than 69° C.

The evaluation for the temperature condition was examined by winding a magnetic tape comprising PET as the base around the circumference of a hub having a taper amount (outer circumference ratio) of 1.0001, thermally treating it at a humidity of 20%, for 48 hours at a temperature of 50° C. or 60° C., followed by measuring the amount of the magnetic tape curved (mm/m). FIG. 11B shows the results of the experiments and is a graph showing the relation between the temperature conditions and the amount of the curve.

As the thermal treatment temperature is higher (60° C.), the amount of the magnetic tape curved become larger. Specifically, it can be understood from FIG. 11B that in order to impart a desired amount of the curve to the magnetic tape for a shorter period of time, the thermal treating temperature may be set at a higher temperature. If the magnetic tape is heated at a temperature higher than the glass transition point of the base of the magnetic tape, the magnetic tape cannot keep a normal shape. Consequently, the thermal treatment temperature should not be lower than the glass transition point. In other words, the thermal treatment condition is preferably as high as possible provided that the magnetic tape can keep its normal shape.

(2-2) Humidity Condition:

The humidity condition at the time of the thermal treatment is not specifically restricted, but it has been proven that as the humidity becomes higher, the amount of the magnetic tape curved becomes larger.

Figure 12A:
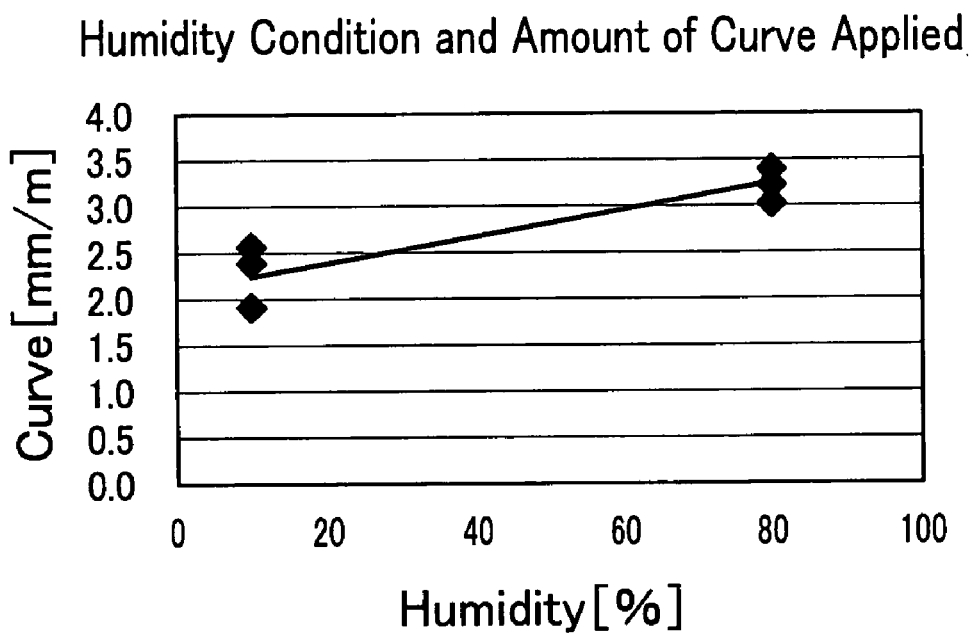
FIG. 12A is a graph showing the relation between the humidity conditions and the amount of the curve applied.
Figure 12B:
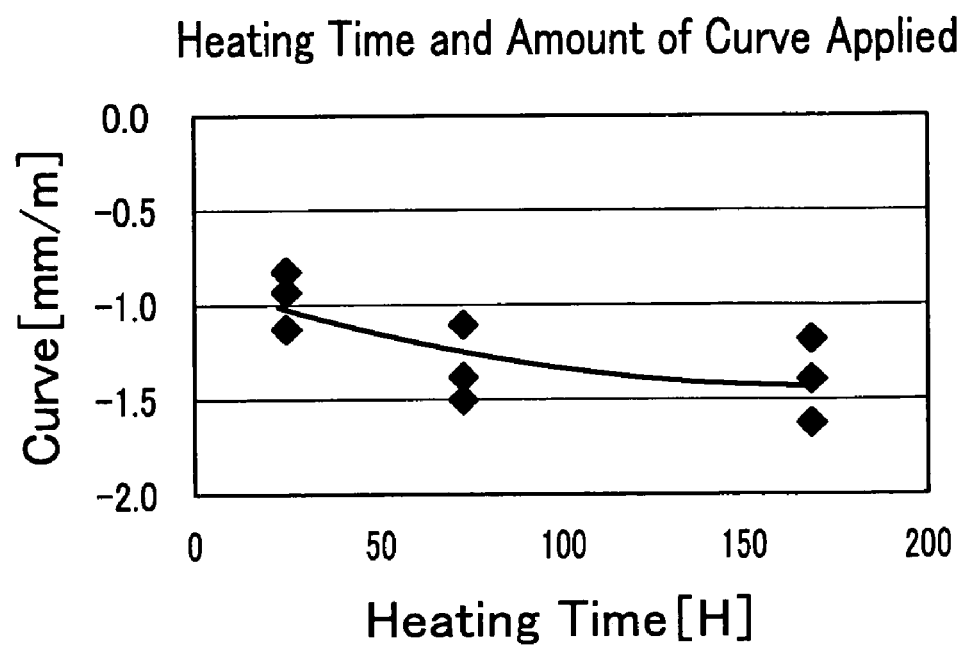
FIG. 12B is a graph showing the relation between the heating time and the amount of the curve applied.

The evaluation for the humidity condition was examined by winding a magnetic tape comprising PET as the base around the circumference of a hub having a taper amount (outer circumference ratio) of 1.0003, thermally treating it at a temperature of 60° C. for 48 hours at a humidity of 10% or 80%, followed by measuring the amount of the magnetic tape curved (mm/m). FIG. 12BA shows the results of the experiments and is a graph showing the relation between the humidity conditions and the amount of the curve.

It can be understood therefrom that the curved amount becomes higher if the humidity is higher (80%). Specifically, it can be understood from FIG. 12A that in order to impart the magnetic tape to a desired amount of the curve for a shorter period of time, the humidity may be set at a higher temperature.

(2-3) Heating Period

Although the heating period is not specifically restricted, it has been proven that the heating period becomes longer, the curved amount becomes larger.

The evaluation of the heating period was examined by winding a magnetic tape comprising PET as the base around the circumference of a hub having a taper amount (outer circumference ratio) of 1.0001, thermally treating it at a temperature of 50° C. and at a humidity of 10%, for 24 hours, for 72 hours, or for 168 hours, followed by measuring the amount of the magnetic tape curved (mm/m). FIG. 12B shows the results of the experiments and is a graph showing the relation between the heating time and the amount of the curve applied.

From FIG. 12B, it can be understood that although the curved amount become larger when the heating period is longer, the changing amount thereof is gradually decreased. Since a shorter period is generally preferred for the thermal treatment, the heating period is preferably determined in combination with other production conditions.

(3) Outer Circumference of Hub

Figure 13:
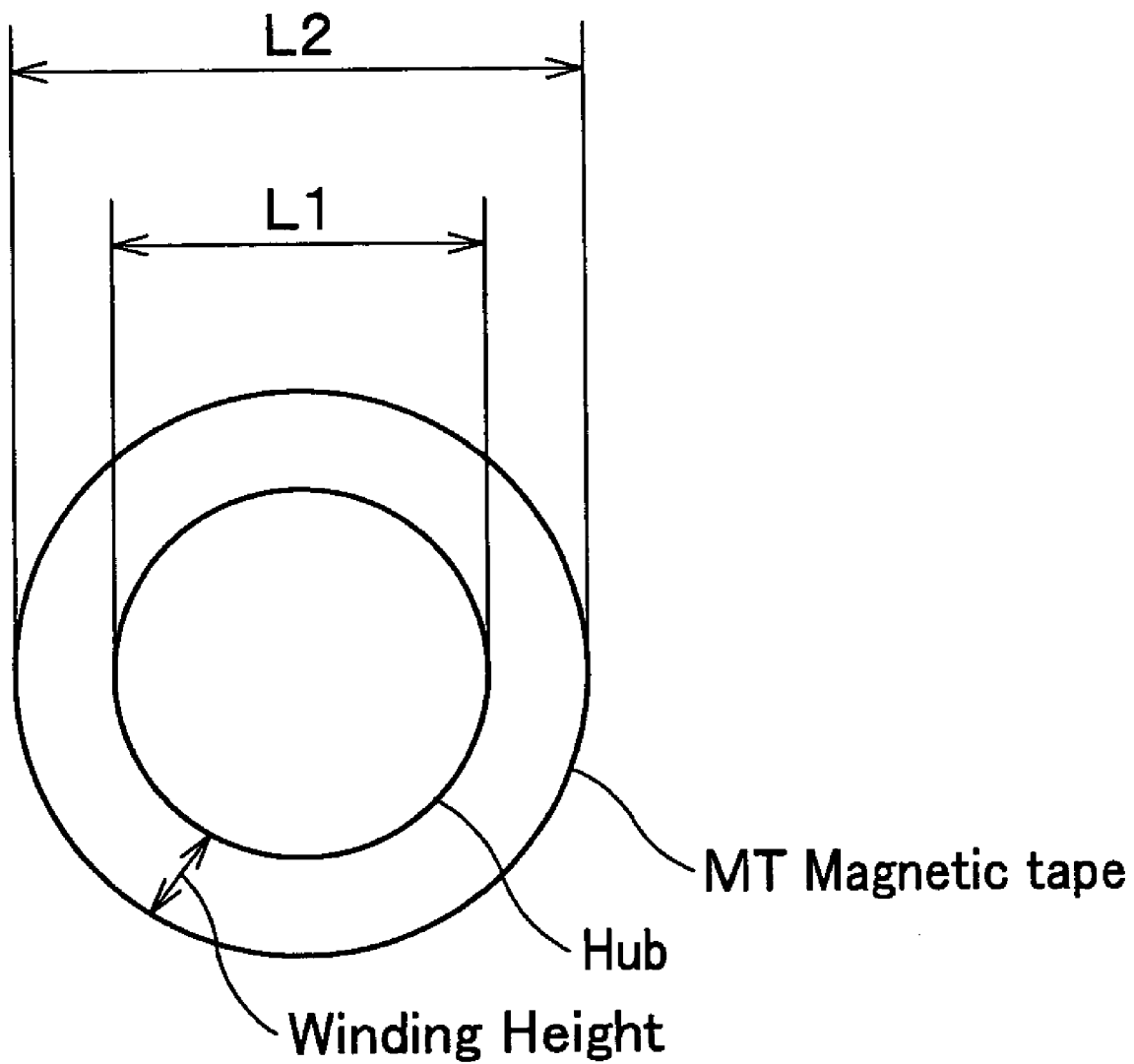
FIG. 13 explains a ratio of the external diameter L1 of the hub and the external diameter L2 after winding the magnetic tape.
Figure 14:
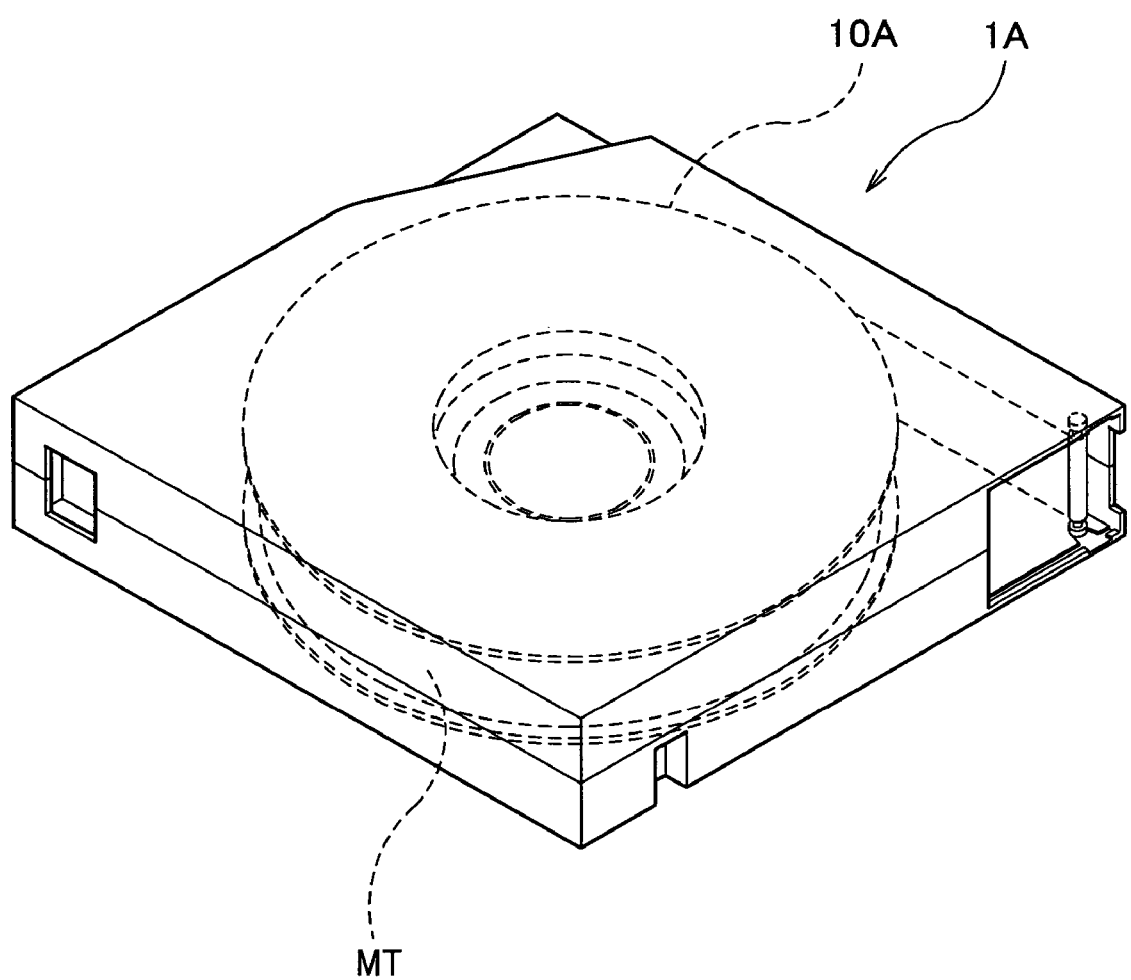
FIG. 14 is a perspective view of a magnetic tape cartridge having one tape reel accommodated therein.
Figure 15A:
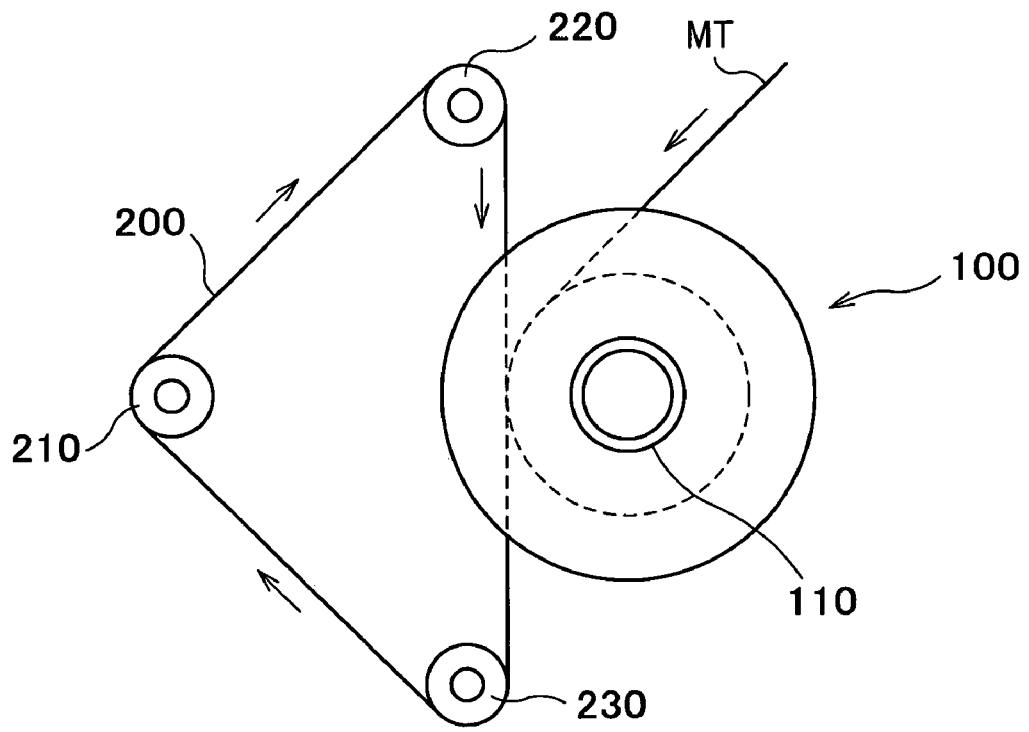
FIG. 15A shows one example of the conventional method for decreasing the disordered winding of the magnetic tape and FIG. 15B shows another example of the conventional method for decreasing the disordered winding of the magnetic tape.
Figure 15B:
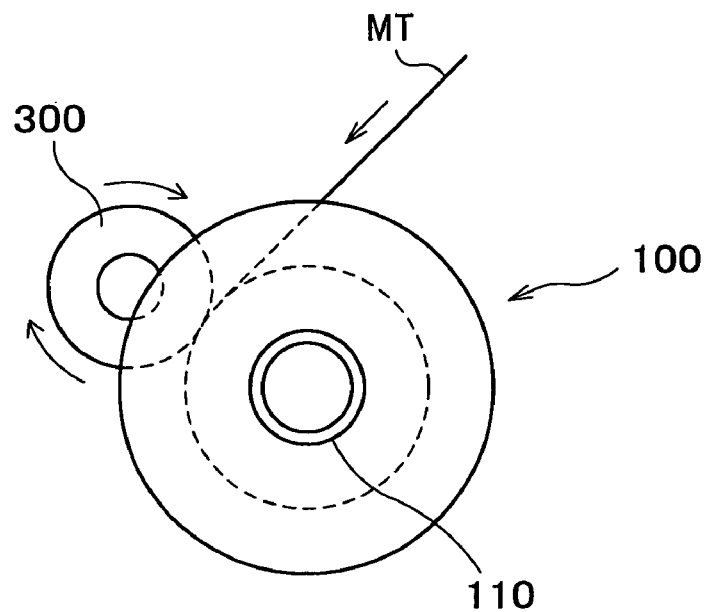
Figure 16A:
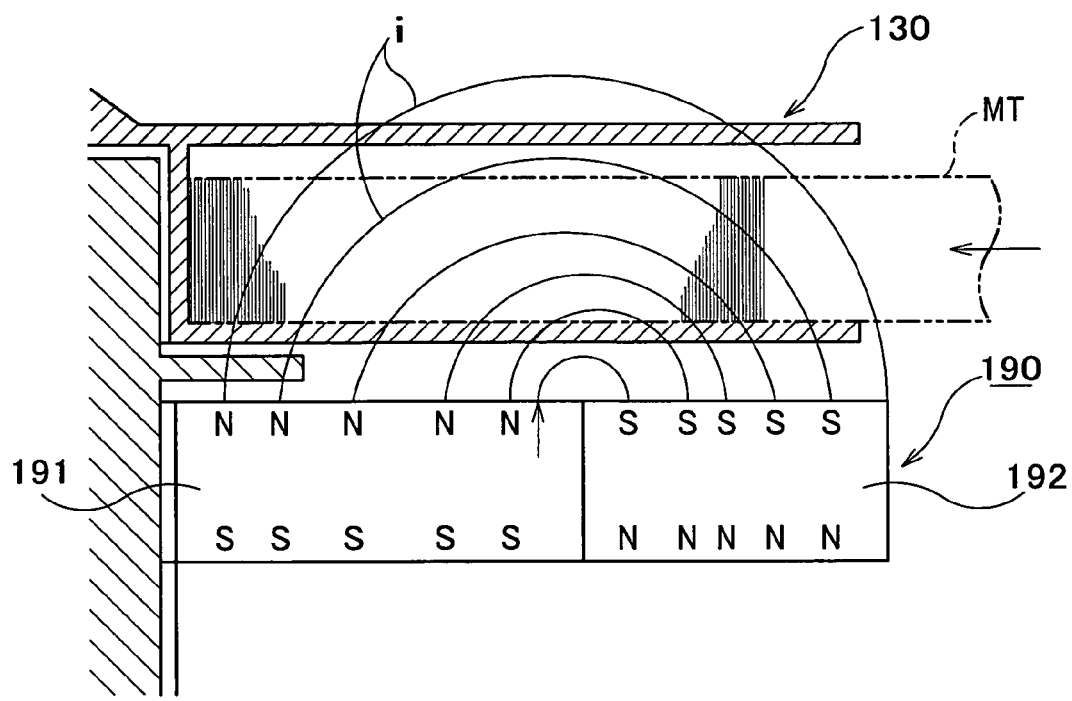
FIG. 16A shows still another example of the conventional method for decreasing the disordered winding of the magnetic tape.
Figure 16B:
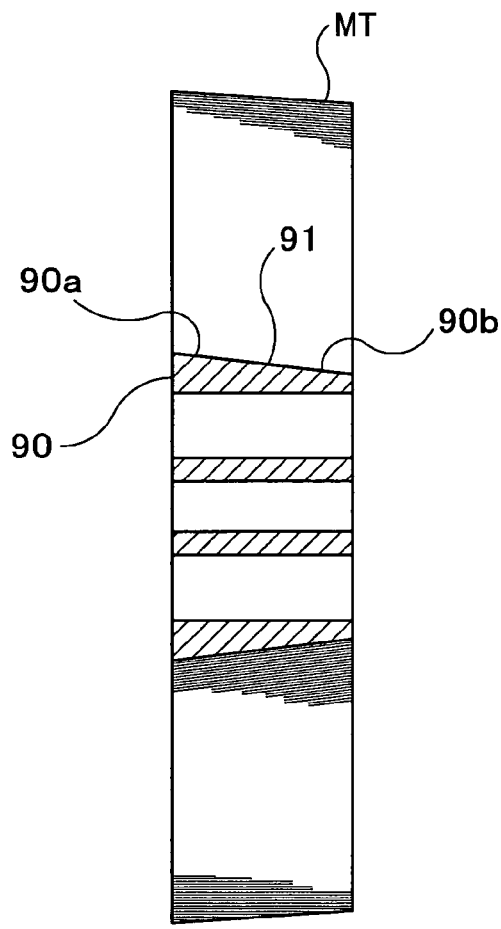
FIG. 16B shows one example of the conventional method for imparting a winding habit to the magnetic tape.

Influence of the hub circumference formed into a tapered state upon the magnetic tape is decreased towards the outer circumference of the pan cake. Consequently, the outer diameter of the hub becomes as large as possible within the range tolerable in the device for winding the magnetic tape, whereby the winding height (see FIG. 13) of the magnetic tape is decreased to makes it easy to have the influence of the taper of the hub circumference up to the outer circumference. Specifically, the ratio of the outer diameter L1 of the hub to the outer diameter L2 of the hub after winding the magnetic tape (L1/L2) is desirably from approximately 0.3 to 0.9.

The preferred embodiments and the working examples of the present invention have been described above, but the present invention is not restricted thereto, and various modification and verification can be made without departing from the spirit and scope of the present invention.

While in the first embodiment, the magnetic tape MT is wound around the hub circumference 31c (see FIG. 5A) in a tapered state, followed by thermal treatment whereby a good winding habit is imparted to the magnetic tape MT, the present invention is not restricted thereto. For example, a similarly good winding habit can be imparted when the central position for forming a rib of the tape reel is shifted from the central position for winding the magnetic tape, and the magnetic tape is wound, because since the central position of the rib is not constituent with the central position for winding the magnetic tape, the hub is deformed toward the inside of the tape reel, resulting in the hub circumference having a tapered state.

Figure 5B:
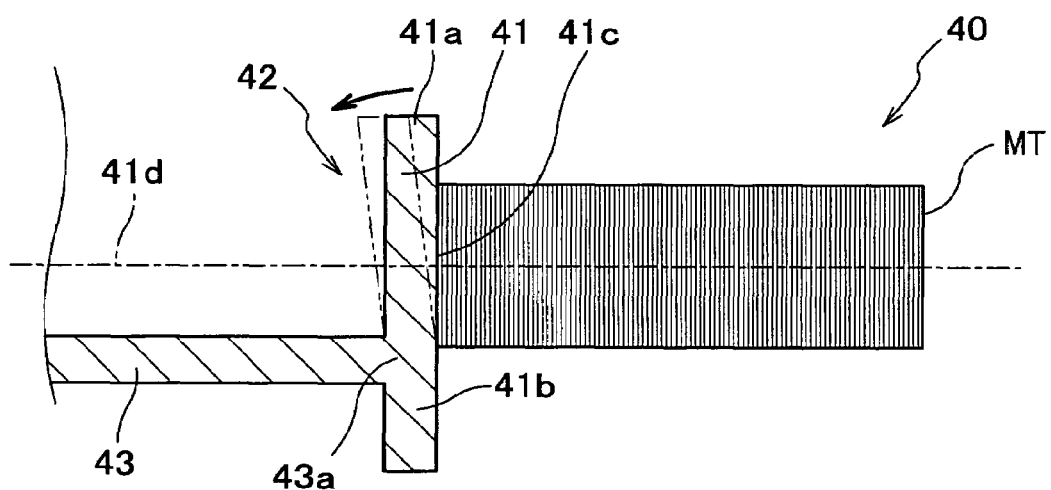
FIG. 5B is a cross-sectional view of the pan cake where the magnetic tape is wound around a rib formed being shifted from the central position of the hub circumference surface (second embodiment)

Specifically, in a second embodiment of the present invention, as shown in FIG. 5B, a tape reel 42 is formed in which a rib 43 is shifted from the central position 41d of a hub 41 in the width direction, and the magnetic tape MT is wound around the tape reel 42 to be a pan cake 40, followed by thermal treatment. In such a pan cake 40, as shown by the ideal line of FIG. 5B, one end 41a of the hub 41 of the tape reel 42 is deformed toward the inside of the tape reel 42 (at this time, the hub circumference 41c is slanted in a tapered state so that the hub are thickened from one end 41a to another end 41b). This makes it possible to apply a uniform curve to the magnetic tape to thereby impart to it a good winding habit (see FIG. 6). The position 43a for forming the rib 43 is desirably shifted at least 10% from the central position of the hub circumference 41c.

Figure 5C:
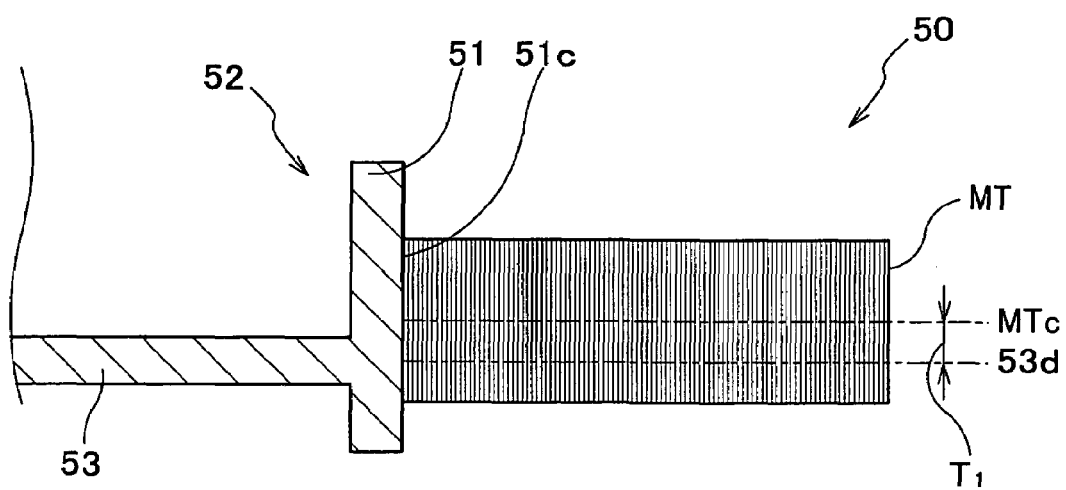
FIG. 5C is a cross-sectional view of the pan cake where the magnetic tape is wound so that the central position of the winding is shifted from the central position of the hub circumference surface (third embodiment)

In a third embodiment of the present invention, as shown in FIG. 5C, a central position MTc for winding the magnetic tape may be shifted from a central position 53d of a hub circumference 51c of a tape reel 52, and the magnetic tape is wound around the tape reel 52 to make a pan cake 50, which is then thermally treated. Similar to the pan cake 40, in such a pan cake 50, the hub 51 of the tape reel 52 is deformed to form a tapered state and, thus, applying a curve to the magnetic tape MT and imparting to it good winding habit (see FIG. 6). The amount of the shift T from the central position MTc for winding the magnetic tape to the central position 53d of a hub circumference 51c of a tape reel 52 is preferably approximately 1 mm.

What is claimed is:

1. A method for producing a magnetic tape comprising: a stage for winding a magnetic tape around a tape reel; and a stage for thermally treating the magnetic tape wound around the tape reel under preset thermal treatment conditions to impart a winding habit to the magnetic tape;

said magnetic tape being wound around a tape reel whose hub circumference is formed into a tapered/conical shape in said stage for winding a magnetic tape.

2. The method according to claim 1, wherein said magnetic tape is wound around a tape reel whose hub circumference is formed into a tapered/conical shape by slanting the hub circumference depending upon the winding force of the wound magnetic tape.

3. The method according to claim 1, wherein a rib is shifted from the central position of the hub of said tape reel in the width direction whereby the hub circumference is formed into a tapered/conical shape.

4. The method according to claim 1, wherein the magnetic tape is wound around the tape reel in the state that the central position for winding the magnetic tape around the tape reel is shifted from the central position of the hub circumference of the tape reel whereby the hub circumference is formed into a tapered/conical shape.

5. The method according to claim 1, wherein said preset thermal treatment conditions presets the temperature, the humidity, or both where the heating temperature is set to be just below the glass transition point of the base making up the magnetic tape, and where the humidity is set to be from 50 to 90%.

6. The method according to claim 1, wherein said temperature just below the glass transition point of the base is a temperature up to 30° C. lower than the glass transition point.

7. The method according to claim 1, wherein said thermal treatment is performed at a temperature sufficient for imparting given winding habit to the magnetic tape and not lower than a temperature which deteriorates performance of a base making up said magnetic tape.

8. A method for improving a winding form of a magnetic tape by imparting a winding habit to the magnetic tape, comprising: a stage for winding a magnetic tape around a tape reel; and a stage for thermally treating the magnetic tape wound around the tape reel under preset thermal treatment conditions to impart a winding habit to the magnetic tape;

said magnetic tape being wound around a tape reel whose hub circumference is formed into a tapered/conical shape in said stage for winding a magnetic tape.

9. The method according to claim 8, wherein said magnetic tape is wound around a tape reel whose hub circumference is formed into a tapered/conical shape by slanting the hub circumference depending upon the winding force of the wound magnetic tape.

10. The method according to claim 8, wherein a rib is shifted from the central position of the hub of said tape reel in the width direction whereby the hub circumference is formed into a tapered/conical shape.

11. The method according to claim 8, wherein the magnetic tape is wound around the tape reel in the state that the central position for winding the magnetic tape around the tape reel is shifted from the central position of the hub circumference of the tape reel whereby the hub circumference is formed into a tapered/conical shape.

12. The method according to claim 8, wherein said preset thermal treatment conditions presets the temperature, the humidity, or both where the heating temperature is set to be just below the glass transition point of the base making up the magnetic tape, and where the humidity is set to be from 50 to 90%.

13. The method according to claim 8, wherein said temperature just below the glass transition point of the base is a temperature up to 30° C. lower than the glass transition point.

14. The method according to claim 8, wherein said thermal treatment is performed at a temperature sufficient for imparting given winding habit to the magnetic tape and not lower than a temperature which deteriorates performance of a base making up said magnetic tape.

* * * * *